Aug. 31, 1937.　　　B. B. FORTNEY　　　2,091,275
LIGHT PROJECTION SYSTEM AND PROJECTION LENS THEREFOR
Original Filed July 30, 1932
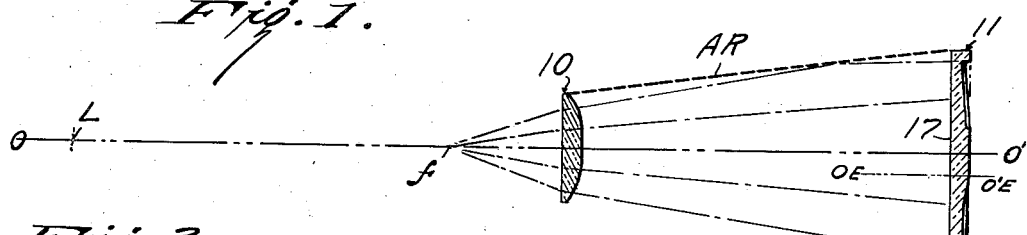
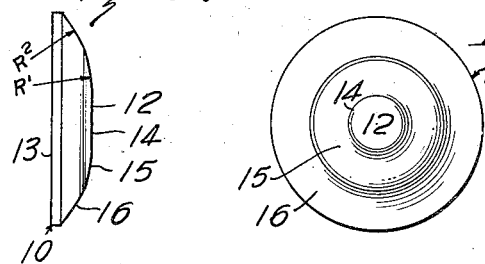
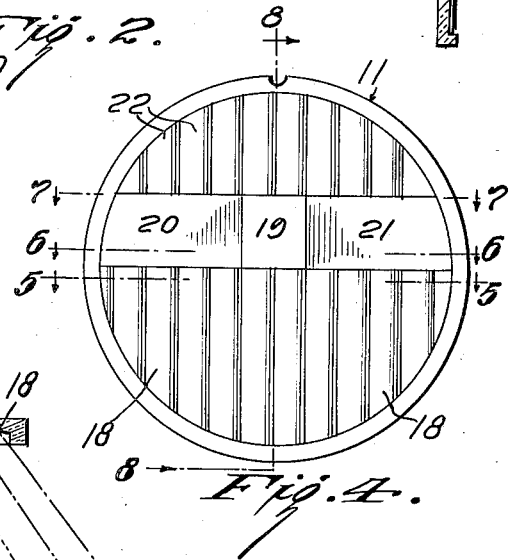
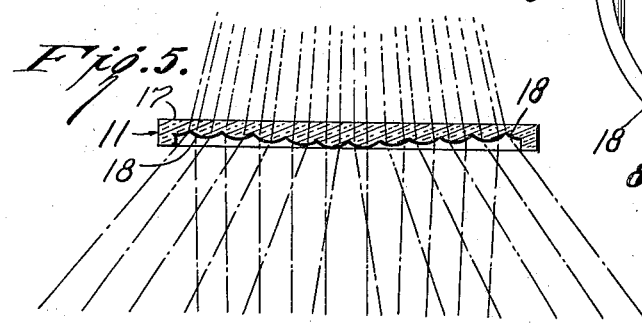
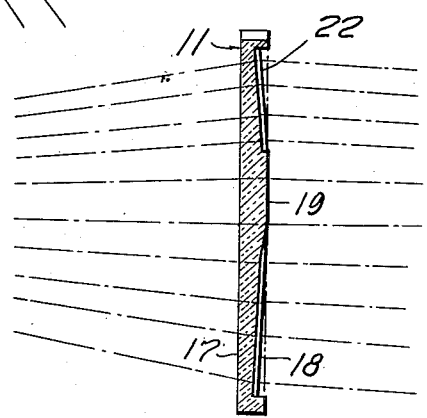
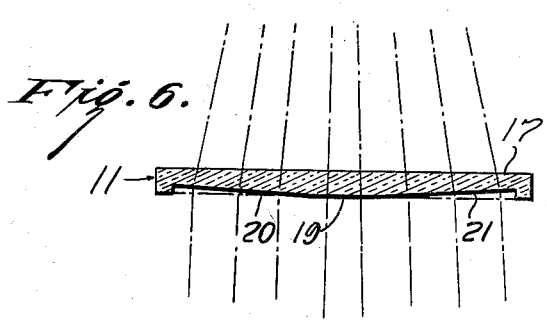
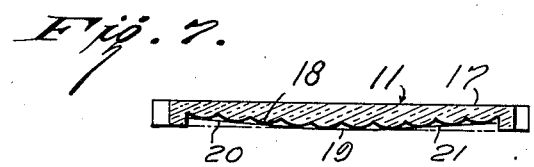
INVENTOR
BRAUDDUS B. FORTNEY,
BY
his ATTORNEY

UNITED STATES PATENT OFFICE 2,091,275

LIGHT PROJECTION SYSTEM AND PROJECTION LENS THEREFOR

Brauddus Brock Fortney, Louisville, Ky.

Application July 30, 1932, Serial No. 626,785
Renewed October 10, 1935

9 Claims. (Cl. 240—41.3)

This invention relates to a method of light projection for illuminating purposes and to projection lenses.

Present day illuminating systems for roadway illumination and for similar purposes, such as marine, aviation and locomotive highway illuminating, which may generally be referred to as headlights, utilize a concentrated source of light, such as a filament or arc of intense candlepower and for purposes of controlling the projection of the luminous energy of this light source, reflectors are used to project the rays emanating from the light source, principally by the use of parabolic reflectors. In using projection systems of this general character, it is appreciated that the rays may be projected for a considerable distance, utilizing a parabolic reflector with the light source adjacent the vertex, the resulting beam reflected from the parabolic reflector emanates as a cylindrical beam. For purposes of roadway illumination, and for effecting a distribution of the light reflected from the parabolic reflector, headlight lenses have been devised and these constitute, in general, multiple prisms or lenses which modify the normal cylindrical beam emanating from the parabolic reflector, to distort the same by spreading it horizontally for roadway distribution.

The standards of various state laws regulating headlights, necessitates compliance with such general standard as approved by the American Engineering Standards Committee, referred to in Bureau of Standards Circular No. 276, by the Department of Commerce, Bureau of Standards, entitled Motor Vehicle Headlight. These standards require that the cylindrical beam emanating from a parabolic reflector be spread sidewise, and for this purpose, lenses composed of flutes or prisms are used projecting a beam with very little vertical spread, and with such spread in the horizontal plane that the screen pattern resulting from such projection is of general shallow elliptical outline. While this old method of distribution of light from a parabolic reflector has met with considerable approval, and is in extensive use, my discoveries have indicated that these systems are highly objectionable in that they cause elements of disturbance and irritation to the eye of an approaching observer, as well as providing a system in which the distribution of the light, with positive control, is extremely difficult.

With such systems, now generally in use, involving the combination with lenses having flutes or prisms intended to spread the light in the horizontal plane, with very little spread in the vertical plane, obtained by utilizing the beam projected from a reflector which, in its major characteristics projects a beam with parallel rays or converging rays upon the lens, there is an accompanying phenomenon, which clearly indicates that the projected beam before it actually spreads as finally analyzed, is inverted for a distance in front of the lens and that this inversion of the beam is also accompanied by intense and irritating light rings, at points of inversion or the conjugate foci of the projected rays in front of the headlight.

It is therefore contemplated as an object of my invention to provide a projection system for projecting light, including not only projecting the light for a great distance, but also for spreading and distributing it, for controlled operating conditions, for illuminating the horizontal surfaces of the roadway or landing field, in which the light distribution is uniform and is therefore free from objectionable glare and irritating effects resulting from inverting the rays emanating from a projection system in front of the lens that is utilized to effect the distribution of light.

It is further contemplated by my invention to provide a projection system for projecting light for illuminating purposes, particularly for illuminating the roadway of vehicles, such as locomotives or landing fields in aviation illumination, in which the emanating beam of light is spread in accordance with its desired purpose, without inversion of the beam in front of the lens and without the formation of objectionable glare forming rings or spots, constituting the inversion points of conjugate foci of the projecting system.

It is a further object of my invention to provide a lens system, for proper distribution of light for roadway, railway, marine and aviation illumination in which substantially all the rays are projected from a light source to obscure all uncontrolled rays and to converge substantially the entire spherical angle of light emanating from a light source within the headlight and then direct it outwardly, substantially entirely as a divergent beam before projection through lenses which modify the same to distribute it over such angles as are necessary for roadway illumination.

It is further contemplated as an object of my invention to provide a lens system in which provision is made for intensely illuminating distant points and in which portions of the beam are spread over the roadway or horizontal surface, with safety for seeing, by eliminating elements of glare or irritation, when such projection system is directly viewed, characterized by spreading only a diverging beam of light and avoiding any convergence of light in front of and outside of the projection system.

To attain these objects and such further objects as may appear herein or be hereinafter pointed out, I make reference to the accompanying drawing, forming a part hereof, in which—

Figure 1 is a vertical longitudinal section showing my lens system;

Figure 2 is a frontal view of the focal lens of such system;

Figure 3 is a side elevation thereof;

Figure 4 is a face view of the frontal lens of my system;

Figure 5 is a section taken on the line 5—5 of Figure 4;

Figure 6 is a section taken on the line 6—6 of Figure 4;

Figure 7 is a section taken on the line 7—7 of Figure 4;

Figure 8 is a section taken on the line 8—8 of Figure 4.

For purposes of a clearer understanding of the method of projection as contemplated by me, reference will be made to the accompanying drawing. For a lens system in which a focal lens 10 is disposed intermediate a frontal lens 11, and a light source L, these lenses are best suitable for use in connection with headlights described and claimed in my prior applications, S. N. 261,004 now Patent No. 1,883,359; S. N. 335,875 now Patent No. 1,883,361; S. N. 335,876 now Patent No. 1,883,360, all granted October 18, 1932, or in my applications filed on even date herewith entitled (1) Incandescent lamp and projection device Serial No. 626,783 and (2) Nonglare headlight construction Serial No. 626,784.

In this system of projection, substantially all of the light emanating from the source L is converged adjacent a focal point F. Those rays adjacent the optical axis O—O' for a small area are projected in parallelism. Where the condensing system in my prior filed applications, and those previously referred to and filed on even date herewith, are used, this condition will occur, in which form of projection system all other rays are obscured from either of the lenses 10 and 11. For other purposes, where a highly nucleated light source is used, this light source may be positioned at the focal point F, so that substantially only divergent rays will be projected upon the lens 10, except adjacent the optical axis where parallel rays are projected thereon.

The lens 10 is a plano-convex lens whose surface 12 is ground with a convex surface, and whose surface 13 is plain. The convex surface 12, adjacent the optical axis is ground so that the section 14, adjacent the optical axis, is planoplano. The concentric section 15 adjacent the optical axis is convex. The section 16, adjacent the periphery of the lens, is ground with a convex surface of greater curvature. In the system contemplated by my prior applications, the section 15 is plano-convex, to a quantity of +20. The section 16 is ground plano-convex, with a value of +24.

The frontal lens 11 is arranged to be disposed with its optical axis O E—O' E eccentric to the optical axis O—O', and slightly below the same. This lens is ground at its rear surface 17 with a plane section. The front section of the lens below the center line O E—O' E is provided with flutes 18, of a convex curvature. The mean line of these flutes is angularly directed rearwardly away from the center, as will be more clearly apparent from Figure 5. The axial line of these flutes in the vertical plane is angularly directed rearwardly from the portion 19, as will be apparent from inspection of Figure 8.

Above the axial line O E—O' E, for a short distance, the lens is formed with sections 19, 20, and 21. The entire section 19 is plano-plano. The sections of the prisms 20 and 21 are polished to be angularly disposed rearwardly from the center, as more clearly apparent from an inspection of Figure 6.

Disposed immediately above the portions 19, 20, and 21, the lens is formed with flutings 22, of general convex character, as more clearly apparent from an inspection of Figure 7. The mean line running through the flutings 22 is angularly disposed in a line parallel to the surface of the prisms 20 and 21. In the vertical section, the flutings 22 are angularly disposed rearwardly, from the center to the periphery, as will be clearly apparent from an inspection of Figure 8.

With the assembly as provided, I use a beam which impinges the sections 15 and 16 only as divergent rays and these pass through the lens 10 so that they will be slightly converged. The rays passing through the sections 15 and 16 are emitted as divergent rays for the section surrounding the optical axis O—O', and these rays will then be impinged upon the lens 11. As the lens 11 has been disposed eccentrically to the optical axis O—O', the rays emitted uppermost from the lens 10 would ordinarily strike outside the periphery of the lens 11. In such construction, it is contemplated by me to use an auxiliary reflector of frusto-conical contour, diagrammatically referred to at AR, and of the character described in my prior applications and those disclosed in my co-pending applications filed on even date herewith.

It will be observed that in accordance with the system described, the rays adjacent the optical axis which are projected upon the lens 11 in parallelism, or substantially so, by reason of their passage through the section 14 of the focal lens 10, will be projected through the section 19, without modification. Those rays passing through the prisms 20 and 21 will be converged slightly and be projected beyond the lens substantially in parallelism. The rays striking the lens 11 at the portions formed with flutings 22, will be widely diverged in the horizontal plane and slightly tilted downwardly, as will be more apparent from an inspection of Figure 8. The degree of downward tilt is such as to bring them substantially parallel to the optical axis.

In the projection system as described, the rays projected through the flutings 22 are definitely controlled and need not be modified further, for projection purposes for road distribution. However, it is preferable for purposes contemplated by me, in accordance with my application filed on even date herewith and entitled Non-glare headlight construction, to impinge the rays emanating from the flutings 22 upon a visor formed with an internal reflective surface, to distribute the rays emanating from those flutings in the foreground immediately surrounding the vehicle, where the headlight or projection system is used for this purpose.

The rays impinging upon the lens 11 at the flutings 18 will be drawn upwardly substantially parallel to the optical axis. In the horizontal plane, the rays will be widely divergent, to obtain the proper spread of light for intermediate distant points in front of the projector or headlight, which, in connection with headlights for automobiles, will strike the roadway at distances from eighty to one hundred and fifty feet.

By the construction shown, wherein I use a focal lens formed with the plano-convex surface as described, the conically divergent beam projected through the lens 10 will be of uniform characteristics in the area surrounding that portion about the optical axis, other than that illuminated by the beam emerging from the plano-plano center 14. This gradiently ground convex surface permits of the use of a source of light or of a converging system which gives, in effect, a concentrated source, whose area at the point F is substantial and more than theoretically equivalent to that of a point source, so that the focal area may be intensely illuminated for a substantial distance to either side of the optical axis O—O'.

It will further be observed that by my method, with the exception of the parallel rays adjacent the optical axis, all rays impinging upon the lens 11 are divergent, and no parallel rays are permitted to be impinged upon such portions of the lens 11 which are provided with either the flutes or prisms for spreading the beam to be projected for use upon the roadway or for other purposes, as described.

It will further be observed that those rays which are parallel or substantially so, pass through the plano-plano section 14 of the focal lens 10 and the plano-plano section 19 of the frontal lens 11, and are emitted in a substantially unmodified condition.

The system of projection as illustrated in connection with the lenses described involves the projection of divergent rays only and the spreading in the horizontal plane of divergent rays only. Substantially all parallel rays are left unmodified. Converging rays are not projected or none other than diverging rays are projected upon the lens 11, to be modified, so as to be spread in a horizontal plane. The resulting beam projected by the lens system referred to, is one in which proper distribution to cover predetermined areas is obtained, and in which no irritating source results, as none of the rays are converged into rings constituting the conjugate foci from the light source or the condensing system which may be used. Thus, when the projection system is observed directly, particularly at the outer fringes, glare will be eliminated as the uniformly distributed light will not be irritating and disturbing to the eye of an observer.

Furthermore, by reason of the eccentric disposition of the frontal lens as compared with the optical axis passing through the focal lens, and especially where my system of projection is used in connection with a reflective system to form the converging source of light as the focal area F as described in my prior applications, the intense rays from the reflective surface will be obscured. Further, by projection of the parallel rays through plain sections of lenses without modification, distant points may be illuminated with maximum intensity.

In general, it will thus be observed that I have provided a method of projecting light in which a substantially intense source may be used for distribution of light in one direction, and spreading it in the horizontal plane, without any objectionable effects due to the necessity of modification of the light beam, in this manner, providing a system of illumination which increases the efficiency of light distribution and materially increases the "seeing" efficiency.

It will further be observed that by the lens system and method as contemplated by me, with a nucleated source of light positioned at the focal area obtained from a direct source or that obtained from a light converging system, a non-uniform and non-symmetrical source of divergent rays is transformed into a symmetrical and uniform pattern of less divergent characteristics which, in turn, when projected through the lens 11, is converged or compressed in one plane and spread or diverged in a plane at right angles thereto, with the desirable qualities aforementioned and free from the objectionable effects interfering with proper "seeing" efficiency, or which may cause objectionable glare.

Having thus described my invention and illustrated its use, what I claim as new and desire to secure by Letters Patent, is—

1. In a light projector of the character described, the combination with a projection system capable of projecting the major portion of the spherical angle of rays of light from a source within a small spherical angle as a divergent beam beyond the focal area, and a lens for slightly converging the light rays so projected beyond the focal area, retaining the major portion of said beam as a divergent beam, a second lens including spreading flutes and prisms impinged by said divergent beam for spreading the light rays in one plane and converging the light beam in a plane at right angles to the first plane, the lenses having sections adjacent the optical axis of substantially plain cross section, to provide unmodified substantially all the rays adjacent the optical axis.

2. In a light projector of the character decribed, the combination with a projection system capable of projecting the major portion of the spherical angle of rays of light from a source within a small spherical angle as a divergent beam beyond the focal area, a lens system comprising a gradiently curved plano-convex surface, the section adjacent the optical axis having a plano-plano center, a second lens adapted to receive the rays emanating from the first lens, as a divergent beam, said second lens being provided at sections above and below the optical axis with light spreading flutes.

3. In a light projector of the character described, the combination with a projection system capable of projecting the major portion of the spherical angle of rays of light from a source within a small spherical angle as a divergent beam beyond the focal area, a lens system comprising a gradiently curved plano-convex surface, the section adjacent the optical axis having a plano-plano center, a second lens adapted to receive the rays emanating from the first lens, as a divergent beam, said second lens being provided at sections above and below the optical axis with light spreading flutes, said second lens having an area adjacent the optical axis formed with a plano-plano center.

4. In a light projector of the character described, in combination with a projection system capable of projecting the major portion of the spherical angle of rays of light from a source within a small spherical angle as a divergent beam beyond a focal area, of a lens system arranged to project said rays divergent in one plane and in substantial parallelism in the plane at right angles thereto, comprising a plano-plano focal lens and a frontal lens, said frontal lens having light spreading flutes above and below the optical axis, said flutes being arranged angularly to project the rays substantially in parallelism in the vertical plane above and below the optical axis.

5. In a light projector of the character described, for combination with a projection system capable of projecting the major portion of the spherical angle of rays of light from a source within a small spherical angle as a divergent beam beyond a focal area, a light spreading lens therefor positioned substantially eccentrically with the optical axis of the light source and including at portions above and below the optical axis spreading flutes the mean plane of which is angularly, rearwardly disposed in the vertical plane, said lens having a section adjacent the optical axis formed with a plano-plano cross section, said flutes being oppositely disposed angularly to either side of said section.

6. In a light projector of the character described, for combination with a projection system capable of projecting the major portion of the spherical angle of rays of light from a source within a small spherical angle as a divergent beam beyond the focal area, a light spreading lens therefor positioned substantially eccentrically with the optical axis of the light source and including at portions above and below the optical axis spreading flutes the mean plane of which is angularly, rearwardly disposed in the vertical plane, said lens having a section adjacent the optical axis formed with a plano-plano cross section, and prisms interposed between said fluted sections to either side of said plano-plano center, said flutes being oppositely disposed angularly to either side of said section.

7. In a light projector of the character described, in combination with a projection system capable of projecting the major portion of the spherical angle of rays of light from a source within a small spherical angle as a divergent beam beyond a focal area, of a lens system arranged to project said rays divergent in one plane and in substantial parallelism in the plane at right angles thereto, comprising a focal lens and a frontal lens, said frontal lens having light spreading flutes above and below the optical axis, said flutes being arranged angularly to project the rays substantially in parallelism in the vertical plane above and below the optical axis.

8. In a light projector of the character described, for combination with a projection system capable of projecting the major portion of the spherical angle of rays of light from a source within a small spherical angle as a divergent beam beyond the focal area, a light spreading lens therefor positioned substantially eccentrically with the optical axis of the light source and including at portions above and below the optical axis spreading flutes the mean plane of which is angularly, rearwardly disposed in the vertical plane, a dissimilarly formed axial section, said flutes being oppositely disposed angularly to either side of said section.

9. In a light projector of the character described, for combination with a projection system capable of projecting the major portion of the spherical angle of rays of light from a source within a small spherical angle as a divergent beam beyond the focal area, a light spreading lens therefor positioned substantially eccentrically with the optical axis of the light source and including at portions above and below the optical axis spreading flutes the mean plane of which is angularly, rearwardly disposed in the vertical plane, a dissimilarly formed axial section, said flutes being oppositely disposed angularly to either side of said section and prisms interposed to either side of the axial section between the spreading flutes.

BRAUDDUS BROCK FORTNEY.